United States Patent
Bode et al.

(10) Patent No.: US 10,161,248 B2
(45) Date of Patent: Dec. 25, 2018

(54) METHOD FOR COOLING A REFUGE CHAMBER IN AN EMERGENCY SITUATION

(71) Applicant: Dräger Safety AG & Co. KGaA, Lübeck (DE)

(72) Inventors: Christian Bode, Belau (DE); Sven Neervoort, Siebenbäumen (DE); René Kiewitt, Pronstorf (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 253 days.

(21) Appl. No.: 14/915,697

(22) PCT Filed: Aug. 20, 2014

(86) PCT No.: PCT/EP2014/002284
§ 371 (c)(1),
(2) Date: Mar. 1, 2016

(87) PCT Pub. No.: WO2015/028129
PCT Pub. Date: Mar. 5, 2015

(65) Prior Publication Data
US 2016/0186565 A1    Jun. 30, 2016

(30) Foreign Application Priority Data
Sep. 2, 2013 (DE) .......... 10 2013 014 503

(51) Int. Cl.
*E21F 11/00* (2006.01)
*E21F 3/00* (2006.01)
(Continued)

(52) U.S. Cl.
CPC ............ *E21F 11/00* (2013.01); *E21F 3/00* (2013.01); *F25D 3/045* (2013.01); *F25D 16/00* (2013.01)

(58) Field of Classification Search
CPC ..... E21F 11/00; E21F 3/00; F24F 2005/0032; F24F 5/0017; F24F 5/0021; F24F 2005/0025; F24F 2013/228; F24F 1/42
(Continued)

(56) References Cited

U.S. PATENT DOCUMENTS 4,420,032 A * 12/1983 Van Koppen ......... F24D 11/003
126/400
2002/0011075 A1 * 1/2002 Faqih .................. B01D 5/0006
62/285

(Continued)

FOREIGN PATENT DOCUMENTS

| CN | 101 988 391 A | 3/2011 |
| CN | 201 835 863 U | 5/2011 |

(Continued)

*Primary Examiner* — David J Bagnell
*Assistant Examiner* — Michael A Goodwin
(74) *Attorney, Agent, or Firm* — McGlew and Tuttle, P.C.

(57) ABSTRACT

A method for cooling a refuge chamber (100) with an emergency cooler (10) in an emergency situation includes cooling of a refrigerating agent (22) in a cold accumulator (20) with a cooling device (30) and detecting an emergency situation. Cold being stored in the refrigerating agent (22) of the cold accumulator (20) is released into the refuge chamber (100)—the refrigerating agent (22) of the cold accumulator (20) is exposed for heat transfer with the refuge chamber (100).

20 Claims, 4 Drawing Sheets (51) Int. Cl.
*F25D 3/04* (2006.01)
*F25D 16/00* (2006.01)

(58) Field of Classification Search
USPC .......................................................... 299/12
See application file for complete search history.

(56) References Cited

U.S. PATENT DOCUMENTS

| | | | |
|---|---|---|---|
| 2009/0148556 A1* | 6/2009 | Stippler | C12C 13/00 426/16 |
| 2010/0018391 A1* | 1/2010 | Whittaker | B01D 53/62 95/23 |
| 2010/0071393 A1 | 3/2010 | Tatton et al. | |
| 2012/0304866 A1* | 12/2012 | Barrett | B01D 53/74 96/244 |
| 2013/0047655 A1* | 2/2013 | White | B01D 5/0006 62/264 |
| 2013/0049436 A1 | 2/2013 | Paton-Ash | |

FOREIGN PATENT DOCUMENTS

| | | |
|---|---|---|
| CN | 102 312 680 A | 1/2012 |
| CN | 202 520 357 U | 11/2012 |
| CN | 202 954 832 U | 5/2013 |
| CN | 203 035 224 U | 7/2013 |
| DE | 31 40 120 A1 | 4/1983 |
| DE | 35 32 649 A1 | 3/1987 |
| DE | 60 2004 001 751 T2 | 8/2007 |

* cited by examiner

METHOD FOR COOLING A REFUGE CHAMBER IN AN EMERGENCY SITUATION

CROSS REFERENCE TO RELATED APPLICATIONS

This application is a United States National Phase Application of International Application PCT/EP2014/002284 filed Aug. 20, 2014 and claims the benefit of priority under 35 U.S.C. § 119 of German Patent Application 10 2013 014 503.1 filed Sep. 2, 2013 the entire contents of which are incorporated herein by reference.

FIELD OF THE INVENTION

The present invention pertains to a method for cooling a refuge chamber by means of an emergency cooler in an emergency situation as well as an emergency cooler for cooling a refuge chamber in an emergency situation.

BACKGROUND OF THE INVENTION

It is known that there are possibilities for escape in environments with a high risk potential. This applies especially to mining and tunnel construction. Since the possibility of escape is greatly limited precisely underground, it is common practice to provide underground refuge chambers, to which the workers can escape in an emergency situation. The people remain in this refuge chamber until after the emergency situation has been eliminated and rescue can correspondingly take place. Preservation of life within the refuge chamber must be guaranteed in prior-art refuge chambers for the people who are present in them. This should apply especially to vital functions, e.g., the temperature and the humidity of the air in the refuge chamber. Thus, it shall be ensured that the temperature will not rise to an undesired extent and the air humidity will not increase to an undesired extent due to the presence of the plurality of persons in a refuge chamber. Life-preserving measures could not otherwise be guaranteed with the desired safety any longer.

Monitoring of the temperature, especially cooling of the refuge chamber, usually by air conditioners, is guaranteed in prior-art refuge chambers. These air conditioners require an energy supply. However, emergency situations as they may occur underground are also frequently associated with explosion hazard. For example, there is a risk of so-called firedamp in mining, which could be ignited during the electrical operation of an air conditioner. These air conditioners in prior-art refuge chambers correspondingly must have a so-called explosion proofness, as a result of which the air conditioner becomes very expensive. Since, moreover, the external energy supply is frequently interrupted underground in an emergency situation or is actively interrupted, an emergency power supply, e.g., in the form of batteries, must be made available for the air conditioner. It can thus be stated in summary that cooling is costly and requires a large amount of space for construction in prior-art refuge chambers.

SUMMARY OF THE INVENTION

An object of the present invention is to at least partially eliminate the above-described drawbacks. In particular, an object of the present invention is to make possible the cooling of the refuge chamber even in an emergency situation in case of power failure in a cost-effective and simple manner.

Features and details that are described in connection with the method according to the present invention also apply, of course, in connection with the emergency cooler according to the present invention and vice versa, so that reference is and can always mutually be made to the individual aspects of the present invention concerning the disclosure.

A method is provided according to the present invention for cooling a refuge chamber by means of an emergency cooler in an emergency situation. The method according to the present invention has the following steps for this:

cooling of a refrigerating agent in a cold accumulator with a cooling device, detection of an emergency situation, and release of the cold being stored in the refrigerating agent of the cold accumulator in the refuge chamber (the cold mass—the refrigerating agent—is exposed for heat transfer with the the refuge chamber).

Consequently, the active generation of the cold (the cooling of the mass of the cooler cold accumulator) and the release of the cold (the heat transfer from the refuge chamber to the already cooled mass of the cold accumulator) take place separately from one another according to the present invention. This separation may take place especially in time, so that the cooling of the refrigerating agent can take place in a cold accumulator independently from the emergency situation, especially in a so-called standby operation. The refrigerating agent is correspondingly cooled in the cold accumulator in normal operation underground until it reaches a desired minimum temperature. In other words, the refrigerating agent is charged with cold (heat is removed form the refrigerating agent) in the cold accumulator analogously to charging a battery. The temperature of the refrigerating agent is cooled by the cooling device to this desired minimum temperature or is maintained in the range of that minimum temperature.

Cooling is readily possible for the phase of the standby operation, because a sufficient amount of energy is present and available via a connection to a power supply from the outside. Since the situation is a normal situation, the cooling device also does not have to meet increased requirements, especially no explosion protection requirements must be met. This cooling device can be embodied in a markedly more simple and cost-effective manner compared to the prior-art solutions for cooling a refuge chamber, because, moreover, no emergency power supply is needed in the form of batteries any more, either.

The emergency situation can be detected in the method according to the present invention both manually (manual input) or automatically by means of sensors. The manual input emergency signal and the sensor emergency signal provide an emergency situation detector (detection device). For example, an alarm unit within a mine can thus forward the alarm information to an emergency cooler in the manner according to the present invention. A purely manual detection (manual input), e.g., the opening of the door to the refuge chamber and the entry of the workers, may also lead to the detection of the emergency situation in the sense of the present invention.

The cold being stored is released (the cold mass of the refrigerating agent is exposed for heat transfer) separately from the step of cooling the refrigerating agent. As can clearly be recognized, the cooling device can be operated here fully independently from this release. Consequently, if operation of the cooling device is no longer necessary in an emergency situation, only the cold that is being stored in the refrigerating agent of the cold accumulator is released (the stored cold mass takes on heat of the refuge chamber). The desired reduction of the temperature in the refuge chamber takes place in this manner, so that the effect is equivalent to the prior-art air conditioner. However, since what is involved, according to the invention, is the discharge of the cooling battery, i.e., of the cold being stored in the refrigerating agent, no active operation of an air conditioner has to take place any longer during the emergency situation. It was rather possible to provide for a separation in time between the generation of the cold (removal of heat from the storage mass the refrigerating agent) and the release of the cold (the heat transfer from the refuge chamber to the refrigerating agent (cold mass) of the cold accumulator).

If, however, no explosion alarm has been triggered, for example, in an emergency situation and there is, furthermore, a possibility of maintaining an energy supply, the steps of cooling and of releasing the cold may, of course, also be carried out simultaneously. The cooling battery can thus continue to operate in its charged state and the cold can be released at the same time. The maximum continuous operation of such a method according to the present invention can be markedly prolonged in this manner.

A great variety of materials may be used as refrigerating agents. Thus, both solid storage materials or gaseous storage materials as well as liquid storage materials are conceivable. The combination of a great variety of states of aggregation with different materials or within one material is also conceivable as a refrigerating agent in a cold accumulator according to the present invention.

For example, the functionality of a heat pump, i.e., a combination of processor and throttle, is possible as a cooling device. The cooling of the refrigerating agent may be effected by the cooling device directly or indirectly. It is thus possible the desired cold is generated directly in the refrigerating agent. However, the refrigerating agent may also act as a simple storage device, and an additional cooling medium within the cooling device passes on the generated cold (cooling) to the refrigerating agent.

Due to the reduction of the temperature, by the release according to the present invention of the cold being stored, the dehumidification of the air may, moreover, lead to a further life-preserving quality.

It may be advantageous if the step of cooling the refrigerating agent takes place in a method according to the present invention before or essentially before the onset of the emergency situation and/or the step of releasing the cold being stored takes place during or after the onset of the emergency situation. In other words, there is an unambiguous correlation in time here between the two steps relative to one another in relation to the emergency situation. It is ensured that the cold is released only upon or after the onset of the emergency situation. The cooling of the refrigerating agent takes place essentially before the onset of the emergency situation, so that this standby operation can be distinguished from an emergency operation and it is not necessary to meet increased requirements on the cooling device, especially in respect to explosion protection requirements.

Another advantage can be achieved if the step of cooling the refrigerating agent takes place, furthermore, especially simultaneously with the step of releasing the cold being stored in a method according to the present invention in an emergency situation, in which energy supply is at least partially still available for the cooling device. It can likewise be clearly recognized here how a separation of the two functionalities of generating the cold and releasing the cold is present according to the present invention. These two steps are independent from each other and may be carried out either sequentially or also partially simultaneously. If the emergency situation is a phase in which energy supply is available for the cooling device, this available energy may be used for a further cooling of the refrigerating agent. The maximum duration of the time over which cold can be released from the cold accumulator to the refuge chamber is thus prolonged. This leads to a further improvement of a refuge chamber according to the present invention and of a corresponding method. It also becomes possible in this manner to reduce the space needed for installation and the mount of refrigerating agent and hence the size of the cold accumulator for such intended uses.

Another advantage is if a reduction of the humidity of the air with the cold being stored, especially by means of condensation at a condenser, takes place in a method according to the present invention in addition to the release of the cold being stored. The corresponding position in the Mollier diagram also changes in the refuge chamber due to the reduction of the air temperature. The capacity of the air for absorbing air humidity is thus changed. The colder the air, the lower will be the water content in the air. If the cold is used now according to the present invention to reduce the temperature of the air in the refuge chamber, the air humidity can also be reduced in the same way by condensation. To make a specific condensation possible and especially to avoid the development of fog in the refuge chamber, a corresponding condenser can preset the site of condensation. It is thus ensured that the correlation between temperature and air humidity in the refuge chamber remains within the desired limits for preserving the life of the persons located there.

It is advantageous, moreover, if the liquid water of condensation is collected and is especially made available as non-drinking water in a method according to the present invention during the use of a condenser. The water is clean water, without any contamination. A corresponding suitability for drinking may also have to be guaranteed by adding salts. Since drinking water is usually also lacking for preserving life in a refuge chamber, additional drinking water can be made available in this manner quasi as a side effect by collecting the liquid water of condensation.

It is advantageous, moreover, if water, which is additionally available as drinking water in an emergency situation, is used as the refrigerating agent in a method according to the present invention. As was already explained in the preceding paragraph, the fact that drinking water is additionally made available can lead to a further optimization of the life-preserving functions within the refuge chamber.

It is likewise advantageous if the release of the cold (the heat transfer with the refuge chamber) takes place in a method according to the present invention by at least one of the following mechanisms:

free and/or forced convection of the air in the refuge chamber, free and/or forced convection of the refrigerating agent.

The above list is not an exhaustive list. Free and/or forced convection of the air is defined as heat transfer due to contact of the air with the refrigerating agent. For example, a contact of the air with the refrigerating agent may thus take place by opening corresponding flaps. This convection of the air section thus cooled in the refuge chamber can be improved if a forced convection is generated, e.g., by means of a blower. It is also possible at the same time that the refrigerating agent is set into motion. This may also take place freely and/or in a forced manner. For example, a pump, which makes possible the forced convection of the refrigerating agent in corresponding tubes, may be provided in the sense of a floor cooling or wall cooling or ceiling cooling. Other distribution possibilities are, of course, also conceivable here for releasing and/or distributing the cold in the sense of the present invention depending on the type of the refrigerating agent and the corresponding arrangement of the emergency cooler.

Another advantage may be achieved if the cooling device is switched off in a method according to the present invention when an emergency situation is detected. It is ensured in this manner that independently from the information on the emergency situation, no explosion protection is needed for the cooling device. Emergency situations, which represent at least partially situations associated with explosion hazard, cannot lead in this manner any longer to an increased risk due to continued operation of the cooling device. It often happens that the cooling device is correspondingly also switched off inevitably automatically in an emergency situation due to the energy supply being switched off automatically. It is, of course, also possible to provide a separate sensor system in order to make this functionality available.

The present invention also pertains to an emergency cooler for cooling a refuge chamber in an emergency situation. This emergency cooler has a cold accumulator with a refrigerating agent arranged therein, a cooling device for cooling the refrigerating agent and a releasing device (heat transfer arrangement) for releasing the cold being stored in the refrigerating agent of the cold accumulator into the refuge chamber. The emergency cooler according to the present invention is thus designed especially for carrying out a method according to the present invention. The emergency cooler according to the present invention thus entails the same advantages as they were explained in detail in reference to a method according to the present invention. The cold accumulator may, of course, preferably have insulations in order to reduce or even entirely prevent an undesired loss of cold especially during standby operation. It should also be pointed out here that the steps of cooling the refrigerating agent may be carried out directly or indirectly via another cooling medium depending on the design of the cooling device.

The emergency cooler according to the present invention can be perfected by a condenser, especially in the form of at least one condensation plate, being provided for condensing moisture from the air in the refuge chamber by means of the cold being stored in the refrigerating agent of the cold accumulator. As was explained already, there is a relationship between the air humidity and the temperature for the life preservation quality in a refuge chamber. By providing a condenser, the cold is used in a locally defined manner in order to guarantee an at least partial dehumidification of the air in the refuge chamber. The same advantages are achieved here that were also explained in the corresponding passage in connection with the method according to the present invention. The condenser preferably has a collection tank for the water of condensation, so that further use of the water of condensation, especially as drinking water, is possible.

It is likewise advantageous if the releasing device for releasing the cold being stored in the refuge chamber in an emergency cooler according to the present invention has at least one distributing element for the active distribution of the cold being stored. The design of such a distributing element depends on the corresponding refrigerating agent and the corresponding type of distribution. For example, a pump may thus be used in case of a forced convection of the refrigerating agent. If the air is brought into contact with the refrigerating agent, for example, a blower may be present.

It may be advantageous in an emergency cooler according to the present invention if at least one of the following media is used as the refrigerating agent in the cold accumulator:
water
brine.

The above list is not an exhaustive list. A brine is defined here as an aqueous solution containing dissolved salts. The water may be defined either as pure water or as water containing additives, e.g., for corrosion protection.

It may likewise be advantageous if the cold accumulator is designed as a stratified accumulator for the refrigerating agent in an emergency cooler according to the present invention. It is thus ensured that the mixing of different temperature zones in the cold accumulator is prevented to the greatest extent possible. A defined removal at different levels of the cold accumulator may grant access to different temperature layers. An even more accurate temperature control is thus possible for releasing the cold into the refuge chamber for the subsequent regulation.

It is likewise advantageous if the cooling device in an emergency cooler according to the present invention has a refrigerating medium of its own, which can release cold to the refrigerating agent in the cold accumulator via a heat exchanger. The generation of the cold is additionally separated in this manner even more from the transfer of the cold to the refrigerating agent. A part of the cooling device with the refrigerating medium can thus even be arranged outside the refuge chamber in order to generate the corresponding cold. The cooled refrigerating medium enters the heat exchanger in the cold accumulator through corresponding transport devices or transport lines and can release the cold there to the refrigerating agent. This embodiment consequently represents an indirect possibility of cooling the refrigerating agent.

Further advantages, features and details of the present invention appear from the following description, in which exemplary embodiments of the present invention are described in detail in reference to the drawings. The features mentioned in the claims and in the description may be essential for the present invention individually or in any combination.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
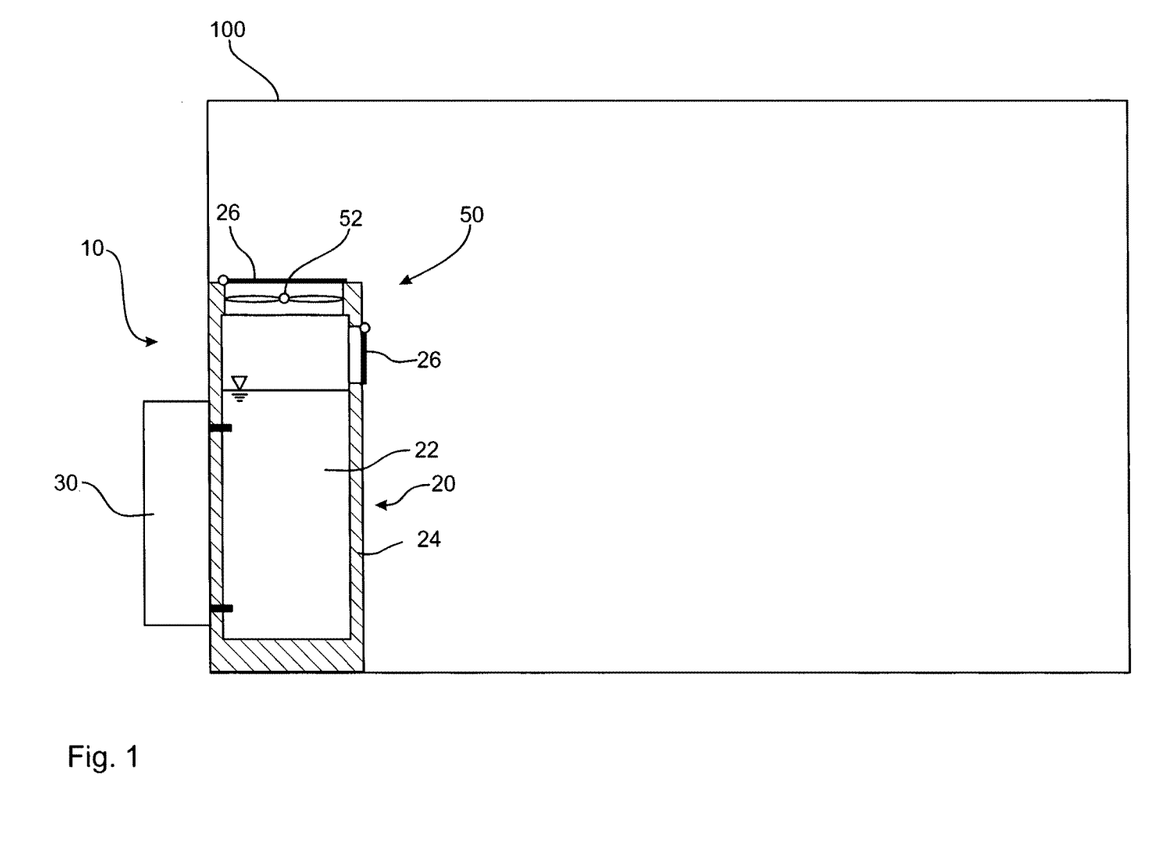
FIG. 1 is a schematic view showing a first embodiment of an emergency cooler according to the present invention.
Figure 2:
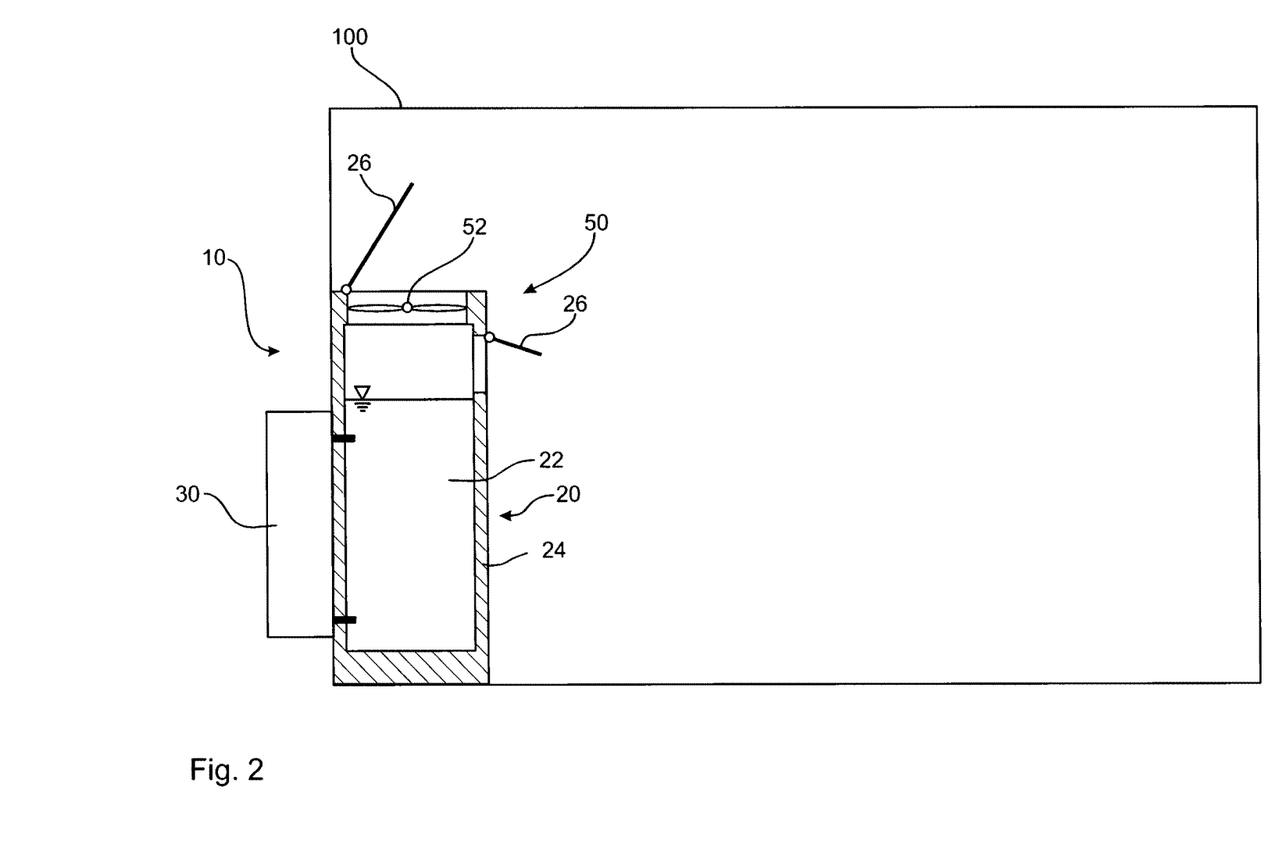
FIG. 2 is a schematic view showing the embodiment according to FIG. 1 during the release of the cold.

FIGS. 1 and 2 show a first embodiment of an emergency cooler 10 according to the present invention. This is arranged at least partly within a refuge chamber 100 in a mine or in a tunnel construction site. A cooling device 30 is arranged at least partly outside the refuge chamber 100 and can cool refrigerating agent 22 directly in a cold accumulator 20. To keep the heat transfer to a minimum—to keep the loss of cold into the refuge chamber 100 as low as possible, an insulation 24 is provided in this embodiment.

With this configuration, if an emergency situation is detected, the flaps 26 are opened and, in particular, a distributing element 52 of a releasing device 50 makes possible an active forced convection of the air in the refuge chamber 100. The opening upon a detection of the emergency situation can thus be brought abut, for example, by manually opening the flaps 26. However, other, especially automated possibilities are also conceivable for opening and detecting the emergency situation.

Figure 3:
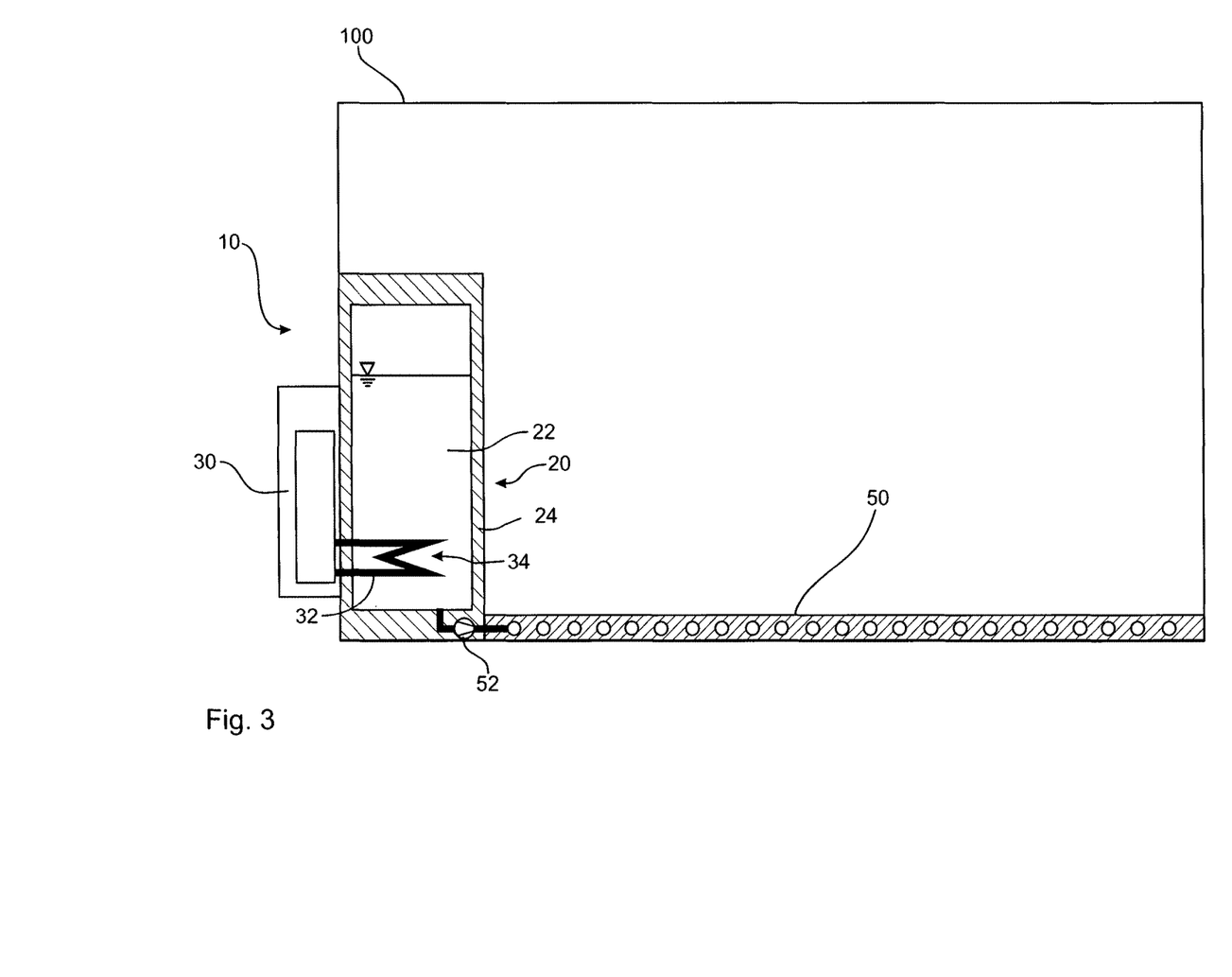
FIG. 3 is a schematic view showing another embodiment of an emergency cooler according to the present invention.

FIG. 3 shows a variant of an emergency cooler 10. Indirect cooling of the refrigerating agent 22 takes place according to this embodiment in the cold accumulator 20. The cold generated can be released via a heat exchanger 34 with heat transferred from the refrigerating agent 22 to the refrigerating medium 32 of the cooling device 30, to cool the refrigerating agent 22.

It can, moreover, be seen in the embodiment according to FIG. 3 that the release and above all the distribution of the cold being stored takes place as in case of a floor cooler as a releasing device 50. Since a liquid form is provided here for the refrigerating agent 22, a pump may be used as the distributing element 52.

Figure 4:
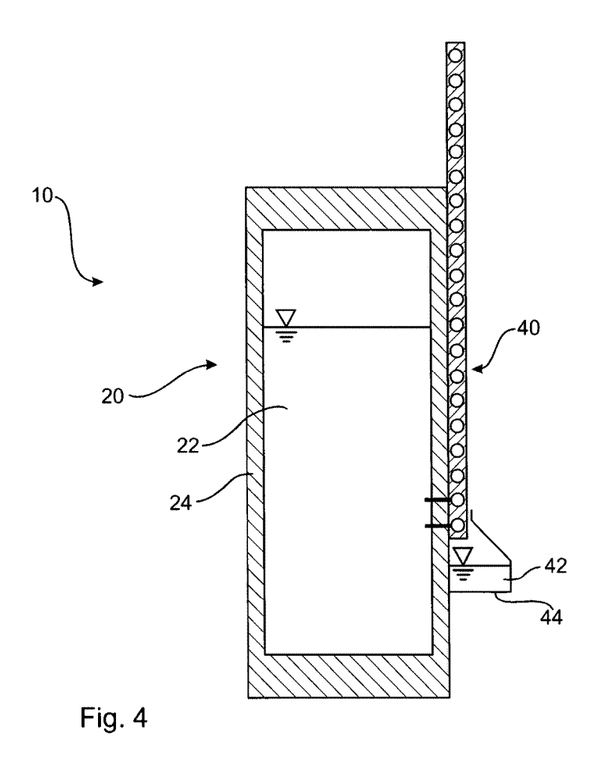
FIG. 4 is a schematic view showing another embodiment of an emergency cooler according to the present invention.

FIG. 4 shows another variant of an emergency cooler according to the present invention. A condenser 40, which acts as a wall cooler additionally for condensing the humidity of the air, is provided here. The condenser 40 designed as a condensation plate makes it possible, in addition, with a collecting tank 44 to collect the water of condensation 42. The water of condensation 42 can then be used further for various purposes, especially as drinking water.

The above explanation of the embodiments describes the present invention exclusively within the framework of examples. Individual features of the embodiments, if technically meaningful, may, of course, also be combined freely with one another without going beyond the scope of the present invention.

While specific embodiments of the invention have been shown and described in detail to illustrate the application of the principles of the invention, it will be understood that the invention may be embodied otherwise without departing from such principles.

The invention claimed is:

1. A method for cooling a refuge chamber by means of an emergency cooler, the method comprising the steps of:
   providing a refrigerating agent in a cold accumulator with a cooling device, wherein the cold accumulator is positioned in or adjacent to the refuge chamber with one or more openings providing direct communication between an interior of the cold accumulator, and the refrigerating agent therein, and an interior of the refuge chamber and wherein one or more flaps close the one or more openings and are manually openable to establish the direct communication between an interior of the cold accumulator, and the refrigerating agent therein, and an interior of the refuge chamber;
   providing a standby operation comprising cooling the refrigerating agent in the cold accumulator to a desired minimum temperature or maintaining the refrigerating agent in the cold accumulator in a range of the minimum temperature;
   detecting an emergency situation during the standby operation and switching from the standby operation to an emergency situation operation; and
   during the emergency situation operation releasing cold being stored in the refrigerating agent of the cold accumulator into the refuge chamber, wherein the emergency situation may include a disconnection from a power supply wherein upon the disconnection from a power supply, the step of releasing cold being stored in the refrigerating agent of the cold accumulator comprises manually opening the one or more flaps to establish the direct communication between the interior of the cold accumulator, and the refrigerating agent therein, and an interior of the refuge chamber.

2. A method in accordance with claim 1, wherein the step of cooling the refrigerating agent also takes place during emergency situation operation with a maintained connection with the power supply or upon a reconnection with the power supply.

3. A method in accordance with claim 1, wherein the step of cooling the refrigerating agent takes place, furthermore, simultaneously with the step of releasing cold being stored during emergency situation operation when an energy supply for the cooling device is at least partly still available.

4. A method in accordance with claim 1, further comprising:
   providing a condenser within the refuge chamber and operatively connected to the cold accumulator; and
   the emergency situation operation further comprises allowing circulation of the refrigerating agent through the condenser, whereby moisture in air within the refuge chamber condenses on the condenser reducing air humidity of the refuge chamber.

5. A method in accordance with claim 4, further comprising:
   collecting liquid water of condensation, from the moisture in air within the refuge chamber that condenses on the condenser, during the emergency situation operation comprising allowing circulation of the refrigerating agent through the condenser; and
   making the water of condensation available in the refuge chamber as emergency drinking water.

6. A method in accordance with claim 5, wherein water, which is additionally available as drinking water in the emergency situation, is also used as the refrigerating agent.

7. A method in accordance with claim 1, wherein the release of the cold is effected by at least one of the following mechanisms:
   free or forced convection of the air in the refuge chamber or both free and forced convection of the air in the refuge chamber, and
   free or forced convection of the refrigerating agent or both free and forced convection of the refrigerating agent.

8. A method in accordance with claim 1, wherein the cooling device is switched off automatically when the emergency situation is detected.

9. An emergency cooler for cooling a refuge chamber in an emergency situation, the emergency cooler comprising:
   a cold accumulator positioned in or adjacent to the refuge chamber;
   a refrigerating agent arranged in the cold accumulator, wherein the cold accumulator comprises one or more openings providing direct communication between an interior of the cold accumulator, and the refrigerating agent therein, and an interior of the refuge chamber;
   a cooling device for cooling the refrigerating agent; and a releasing device for releasing the cold being stored in the refrigerating agent of the cold accumulator into the refuge chamber, the releasing device comprising one or more flaps closing the one or more openings, the one or more flaps being configured as manually openable one or more flaps to establish the direct communication between the interior of the cold accumulator, and the refrigerating agent therein, and an interior of the refuge chamber.

10. An emergency cooler in accordance with claim 9, further comprising:
a condenser comprising at least one condensation plate disposed within the refuge chamber and in direct contact with air within the refuge chamber; and
a refrigerating agent circulating arrangement providing a free or forced convection of the refrigerating agent to circulate refrigerating agent from the cold accumulator to the condenser and from the condenser back to the cold accumulator, whereby moisture from the air in the refuge chamber is condensed on the condenser by means of the cold being stored in the refrigerating agent of the cold accumulator being circulated through the condenser.

11. An emergency cooler in accordance with claim 9, wherein the releasing device further comprises at least one distributing element for an active distribution of the cold being stored for releasing the cold being stored into the refuge chamber.

12. An emergency cooler in accordance with claim 9, wherein at least one of the following media is used as the refrigerating agent in the cold accumulator:
water
brine
dry ice.

13. An emergency cooler in accordance with claim 9, wherein the cold accumulator is configured as a stratified accumulator allowing temperature stratification of the refrigerating agent within the cold accumulator.

14. An emergency cooler in accordance with claim 9, further comprising a detection device detecting an emergency situation, wherein:
the cooling device comprises a heat exchanger connected to the cold accumulator for heat exchange with the refrigerating agent and a refrigerating medium circulated within the heat exchanger, which refrigerating medium can release cold to the refrigerating agent in the cold accumulator via the heat exchanger; and
the cooling device is switched off automatically when the emergency situation is detected by the detection device, whereby the one or more flaps are manually openable to establish the direct communication between the interior of the cold accumulator, and the refrigerating agent therein, and an interior of the refuge chamber.

15. A refuge chamber cooling system comprising:
a cold accumulator;
a liquid refrigerating agent arranged in the cold accumulator;
a powered cooling device for cooling the refrigerating agent;
a heat transfer arrangement for heat exchange between the refuge chamber and the refrigerating agent, the heat transfer arrangement comprising a cooler disposed within the refuge chamber with the liquid refrigerating agent circulating between the cold accumulator and the cooler whereby heat within the refuge chamber is taken up by the refrigerating agent; and
a detection device detecting an emergency situation to activate the heat transfer arrangement for heat exchange between refuge chamber and the refrigerating agent.

16. A refuge chamber cooling system in accordance with claim 15, wherein the powered cooling device cools the refrigerating agent prior to the detection device detecting the emergency situation and powers off the powered cooling device upon the detection device detecting an emergency situation and the detection device activates the heat transfer arrangement upon or after the detection device detecting an emergency situation.

17. A refuge chamber cooling system in accordance with claim 15, wherein heat transfer arrangement operates with free or forced convection of the refrigerating agent or both free and forced convection of the refrigerating agent to provide the circulation of the liquid refrigerating agent between the cold accumulator and the cooler.

18. A refuge chamber cooling system in accordance with claim 17, wherein the cooler comprises a condenser comprising at least one condensation plate disposed within the refuge chamber and exposed to air within the refuge chamber operatively connected to the refrigerating agent to condense water vapor from humid air in the refuge chamber.

19. A refuge chamber cooling system in accordance with claim 15, wherein the heat transfer arrangement further comprises a distributing element to force circulation of the liquid refrigerating agent between the cold accumulator and the cooler, promoting heat transfer between the refrigerating agent and the refuge chamber upon activation of the heat transfer arrangement.

20. A refuge chamber cooling system in accordance with claim 15, wherein:
the refrigerating agent arranged in the cold accumulator comprises at least one of water and brine; and
the powered cooling device comprises a heat exchanger connected to the cold accumulator for heat exchange with the refrigerating agent and a refrigerating medium circulated through the heat exchanger and removing heat from the refrigerating agent in the cold accumulator via the heat exchanger.

* * * * *